United States Patent [19]

Bachrach

[11] 4,350,865
[45] Sep. 21, 1982

[54] METHOD AND DEVICE FOR FORMING A TAPERED EXTRUSION DIE

[75] Inventor: Benjamin I. Bachrach, Dearborn, Mich.

[73] Assignee: Ford Motor Company, Dearborn, Mich.

[21] Appl. No.: 208,964

[22] Filed: Nov. 21, 1980

[51] Int. Cl.³ .............................................. B23P 1/12
[52] U.S. Cl. .................................. 219/69 M; 72/467
[58] Field of Search ........... 219/69 M, 69 E; 72/467; 29/159.2; 204/224 M

[56] References Cited

U.S. PATENT DOCUMENTS

| | | | |
|---|---|---|---|
| 2,945,936 | 7/1960 | Carman | 219/69 E |
| 3,499,830 | 3/1970 | Haggerty et al. | 204/224 M |
| 3,605,475 | 9/1971 | Eakin et al. | 29/159.2 X |

FOREIGN PATENT DOCUMENTS 954348  4/1964  United Kingdom ............. 219/69 E

Primary Examiner—A. T. Grimley
Assistant Examiner—D. A. Tone
Attorney, Agent, or Firm—Frank G. McKenzie; Donald J. Harrington

[57] ABSTRACT

A method and tool for making an extrusion die wherein the extrusion has a lobed helical outer contour. An electrical discharge machining electrode has an identical outer contour. Mounted integrally with the electrode is a lead bar having a guide recess that makes a second helix angle with respect to the axis of the electrode. A guide pin fixedly mounted with respect to the moving assembly is located within the recess. Axial movement and rotation of the electrode through the die blank is controlled by the pin and recess.

7 Claims, 5 Drawing Figures

U.S. Patent  Sep. 21, 1982  Sheet 2 of 2  4,350,865
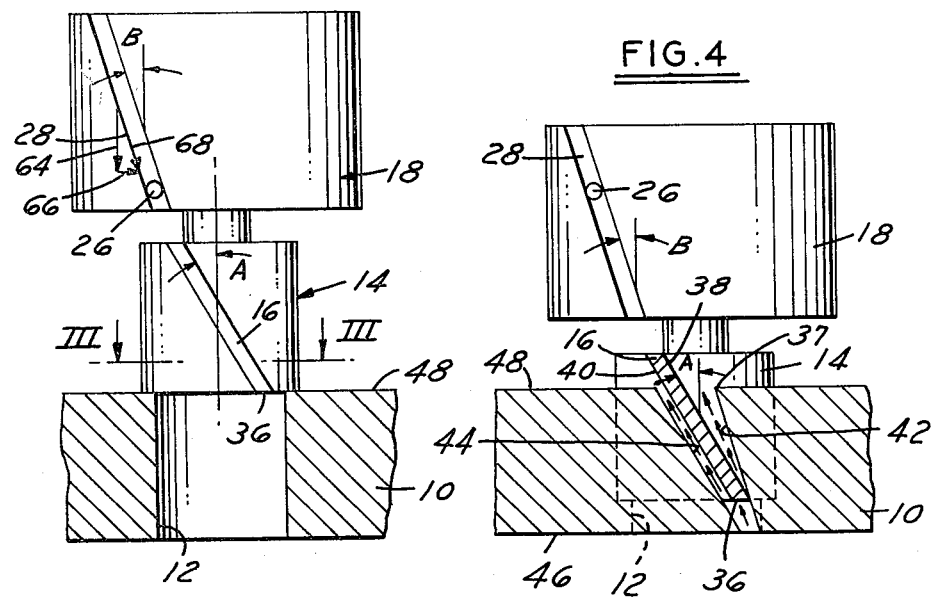
FIG. 2
FIG. 4
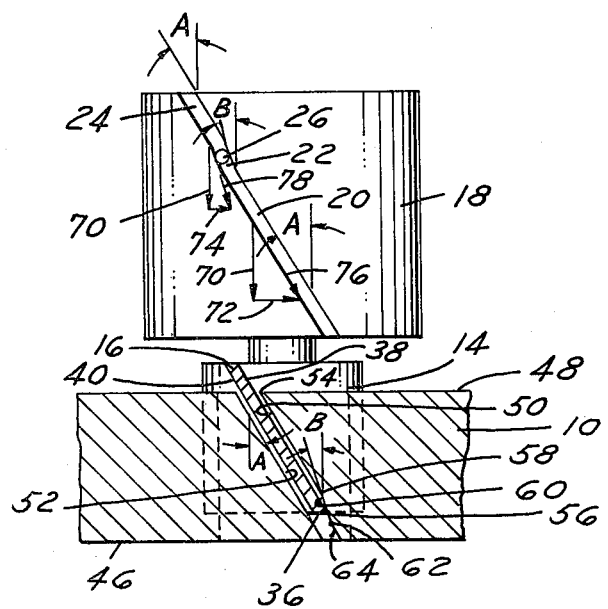
FIG. 5

METHOD AND DEVICE FOR FORMING A TAPERED EXTRUSION DIE

BACKGROUND OF THE INVENTION

1. Field of the Invention

This invention relates to the field of extrusion die manufacture. In particular, the present invention pertains to the field of extrusion die manufacture by electrical discharge machining. More particularly still, the present invention relates to the manufacture of dies for use in forming extruded helical gears.

2. Description of the Prior Art

In the process of forming articles by extruding metal through a die that has the contour of the extrusion formed on its interior surface, it is well known that the extrusion expands after being forced through the forming surface or land of the die. This expansion is the result of elastic deformations that develop in the extrusion when it is forced through the die. The strain energy stored in the extrusion is released after it passes the forming surface of the die because the die generally has only a short forming land but a longer and larger space immediately beyond the land.

Unless the die provides a sufficiently large space beyond the forming orifice the extrusion will expand into tight contact with the interior surface of the die and produce excessively high frictional forces on this surface. The frictional forces may actually exceed the capacity of the forming press to force the extrusion through the die and could produce galling of the die surface and lead to premature failure. Furthermore, an excessive amount of energy is required to overcome the effect of the frictional forces that resist the extrusion forces applied by the press.

Consequently, extrusion dies typically furnish a greater annular space within the die beyond the forming surface than the space defined at the orifice of the die. Often electrical discharge machining methods are used to produce the forming surface of the die. According to this method, a carbon electrode or an electrode of copper-tungsten has its outer surface formed to the shape of the outer contour of the extrusion. The electrode is passed through a die blank and is energized with electrical energy so that arcing occurs between the electrode surface and the interior surface of the die blank. This arcing produces localized melting and chipping of the die blank surface as the electrode passes axially through the die thereby forming on the interior surface of the die blank the contour of the electrode. In order to furnish the larger annular space within the die that accommodates outward expansion of the extrusion a second tapered electrode may be subsequently passed partially through the die to form a cavity beyond the die orifice that is tapered outwardly thus providing the necessary increased volume.

If the extruded part has a noncircular cross section, particularly if it is lobed as is, for example, a gear wheel, it is most important that the portion of the die cavity beyond the forming orifice progressively increase in size along the length of the die in the circumferential sense. The prior art has recognized the difficulties associated with this expansion of the extrusion within the die. Extrusion dies typically are formed so as to produce a greater annular space beyond the forming surface than the space defined by the forming surface. Electrical discharge machining methods, wherein one carbon electrode having the desired shape of the part to be formed is passed through the die to establish the die land, are frequently employed. An electrical current produces a spark between the electrode and the inner surface of the die blank, which operates to remove metal from the die surface in the shape of the carbon electrode. In this way the forming surface of the die is established. However, in order to furnish the relief beyond the forming land, the prior art has typically used a second tapered electrode to form a cavity beyond the die land which is tapered outwardly to provide the requisite increased volume to accommodate the expansion.

However, because two distinct electrodes are used in conventional forming processes, it is extremely difficult to adapt the electrodes to eliminate geometric discontinuities particularly at the cross section where the tapered surface and the land forming surface intersect.

When the extruded part has a noncircular cross section, particularly when it is lobed, an additional difficulty is presented when the inner surface of the die is formed by a process that requires an electrode or forming tool to be inserted into the die for shaping purposes, but then to be withdrawn and the rest of the die surface formed either by another tool or by the same tool introduced into the die from the opposite direction. When this procedure is used, in addition to the difficulties associated with aligning the centerlines of the respective tools so that the axes are colinear, the tools must be additionally controlled so that at the cross section where the first shaping operation terminates and the second begins, the tools correspond circumferentially. This circumferential registry is required because of the nonuniform shape of the outer contour of the parts. For example, where the die is to be used for extruding gear teeth, the flanks of the teeth on the die must form a continuous and smooth surface along the full length of the die, even though the surface is shaped by two distinct passes of a tool through the die blank. When the gear teeth are helical, the difficulty of maintaining circumferential registry is compounded by the requirement that the forming tools rotate while they pass axially through the die blank.

Other and more conventional methods are known in the art for forming the interior surface of an extrusion die. For example, grinding and, before the die blank is hardened, milling and broaching techniques are available. Each of these, however, presents the same difficulties of circumferential misalignment and dimensional discontinuity as discussed previously with respect to electrical discharge machining. Grinding, however, increases the cost to produce the die.

SUMMARY OF THE INVENTION

The present invention provides a method for making an extrusion die from a die blank by using an electrode adapted to form metal by electrical discharge machining. The electrode has a lobed outer surface generally conforming to the shape of the extruded part, the lobes making an angle with the axis of the electrode. The method involves passing such an electrode axially through the die blank while rotating the electrode about its axis with respect to the blank. The speed of rotation of the electrode may vary with respect to the speed at which the electrode passes through the die blank. Alternatively, the speed of rotation and the speed of axial displacement of the electrode may be constant during the entire forming process. In either case, the rate at which the electrode is rotated and moved axially is different from the speed of rotation and axial displacement that would result if the electrode movement were to conform to the helical path of the lobes formed on its outer contour. If the helically formed lobes were to be considered the equivalent of screw threads and the electrode were threaded into the die blank, the helix angle of the lobes would define a fixed path of motion that determines the correlation of the rotary movement and the axial displacement of the electrode. This correlation results from the predetermined helix angle existing between the lobes and axis of the electrode. According to this aspect of this invention, the path along which the electrode is passed through the die blank is other than the path defined by the helix angle of the lobes formed on the outer contour of the electrode. Consequently, the electrode may consider to be threaded through the die blank along a helical path that is angularly disposed with respect to the axis of the electrode, the helix angle being greater or less than the helix angle that the lobes make with respect to the axis of the electrode.

BRIEF DESCRIPTION OF THE DRAWINGS

FIG. 2 is a partial cross section through the die blank centerline and an elevational diagrammatic view of the electrode and lead bar located on the upper surface of the die blank in the position immediately before electrical discharge machining begins to form the die.

FIG. 4 shows a cross section through the die blank taken at plane IV—IV of FIG. 1 and an elevation view showing one gear tooth of the electrode located within the space formed in the die blank by the electrical discharge machining process.

FIG. 5 is a cross section taken at plane V—V of FIG. 1 through the die blank showing one gear tooth of the electrode located in the opening formed in the die blank by the electrical discharge machining process.

DESCRIPTION OF THE PREFERRED EMBODIMENTS

Figure 1:
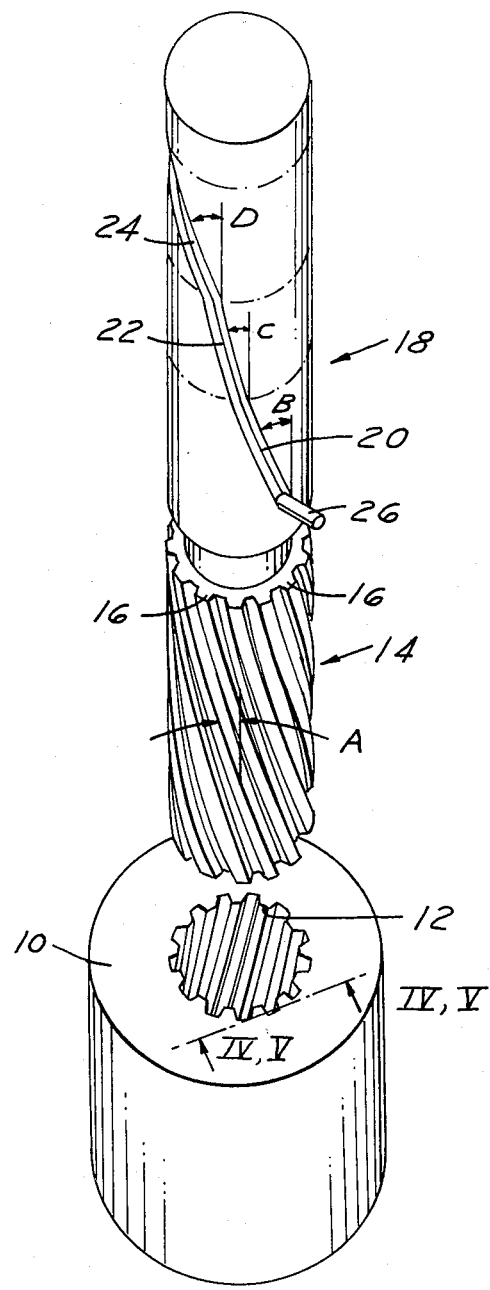
FIG. 1 is an isometric view of an electrode having the lobed, helical contour of an extrusion formed on its outer surface, the electrode being located above a die blank. The electrode has guide recesses disposed angularly with respect to the helix angle of the lobes.

Turning now to a more specific description of the invention, attention is directed first to FIG. 1, which shows a die blank 10 having a circular hole 12 bored along its axial length. An electrode 14 has circumferentially spaced lobes 16 formed on its outer surface, the lobes forming a helix angle A with respect to the electrode axis. The lobes are arranged in the form of helical gear teeth but could for the purpose of the application of this invention be keyways, splines, or any lobed contour with or without a helix angle. The electrode can be formed of any conventional electrode material such as graphite, or carbon-tungsten.

For the purpose of the application of this invention, the motion of the electrode is considered to be controlled by the action of a lead bar which determines the ratio of the tangential velocity of the electrode to its axial velocity. A numerically controlled spindle could also be programmed to similarly control the axial displacement and rotation of the electrode.

Attached to the electrode 14 is a cylindrical lead bar 18 which may be gripped at its upper end by a machine that displaces the electrode axially and passes it through the bore of the die blank 10. The machine permits rotation of the electrode while it is passed axially through the die blank.

The lead bar 18 is formed with three guide recesses 20, 22, 24 on its outer surface. In another embodiment, described with reference to FIGS. 2 and 4, the lead bar has only one guide recess 28, but any number of recesses can be used depending on the nature of the extrusion die surface to be formed by the electrode. The guide recesses are rectangular slots machined into the outer surface of the cylindrical lead bar, each slot making a helix angle B, C, D with the axis of the electrode.

On some part of the driving machine a guide pin 26 is fixedly mounted against movement. The pin extends into the guide recess network and engages the side walls of the recesses as the lead bar moves axially. In this way, axial displacement of the lead bar-electrode assembly necessarily produces rotation. The helix angles B, C, D that define the direction of the recesses with respect to the axis determine also the relationship between the speed of rotation about the axis and the speed at which axial displacement occurs. In any case, at least one guide recess has a helix angle that is unequal to the helix angle of the lobes 16. FIG. 2 shows a lead bar 18 formed with one guide recess 28 having a helix angle B, which is less than the helix angle A, the angle between the lobes 16 and the axis of the electrode A.

Figure 3:
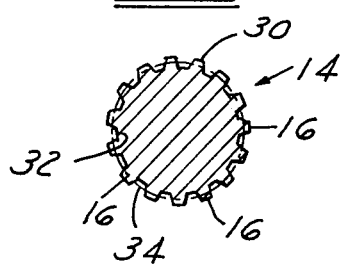
FIG. 3 is a cross section taken at plane III—III of FIG. 2.

FIG. 3 is a cross section through a diametrical plane of the electrode showing a lobe 16, which in this case is a gear tooth, formed on its outer surface. In FIGS. 2, 4, 5, however, only one gear tooth is shown formed on the electrode in order to clarify the description of the forming process that follows. In FIG. 2, the electrode 14 has been lowered into contact with the upper surface 48 of die blank 10, guide pin 26 has been brought into engagement within recess 28 and the electrode axis is aligned with the axis of hole 12, which has been drilled in the die blank 10.

The electrode of FIG. 3 shows the gear teeth extending between an addendum circle 30 and the dedendum circle 32. A pitch circle 34 located between circles 30 and 32 provides a reference across which the thickness of tooth 16, shown in FIGS. 2, 4, and 5, is measured.

According to conventional electrical discharge machining procedure, the electrode is supplied with electrical energy from a high current electrical source that allows an arc to be created between the electrode and the die blank during the process of passing the electrode axially through the die blank. According to this method, a fluid of high dielectric strength flows continually through the die bore between the gear teeth shapes formed on the electrode. The flow proceeds from below the die blank upwardly through bore 12, exiting the die blank at the upper surface between the lobes of the electrode. The sparking process causes localized melting and some chipping away of the die blank material in those regions of the die blank that are closely proximate to the lobes 16 of the electrode. In this way the remaining cavity of the die blank is brought into conformance with the exterior contour of the electrode. The particles of the die blank material dislodged by the arcing process are carried outwardly from the die blank by the flow of the dielectric fluid, which is represented in FIG. 4 by the short arrows.

Initially, with the electrode positioned as in FIG. 2, the machining action caused by the electrode occurs adjacent to the lower edge 36 of the gear teeth 16. The diameter of bore 12 is less than the diameter of the dedendum circle 32 so that the electrode contour is fully impressed upon the inner surface of the die.

FIG. 4 shows the effect of the electrical discharge machining operation when guide recess 28 operates with guide pin 26 to direct and control the speed of rotation and the speed of axial displacement of electrode 14 with respect to the die blank. FIG. 4 shows the electrode located within the die blank after having been fully inserted therewithin from its initial position shown in FIG. 2. In FIG. 4, the gear tooth 16 is shown with a tooth thickness that corresponds to its thickness at the pitch diameter. Accordingly, the tooth has a leading surface 38 and a trailing surface 40.

The machining operation begins when the electrode is energized from a high voltage source, which causes the lower edge 36 of each tooth 16 to remove metal from the die blank 10 but only adjacent the lower edge of the tooth. As the electrode is advanced downwardly into the die blank the guiding effect of pin 26 and recess 28 causes rotation of the electrode along a path that is other than the path that would result if helix angles A and B were equal. In this case, the corner of the gear tooth formed on the electrode at the intersection of the lower edge 36 and the leading edge 38 operates to form surface 42 in the die blank. Surface 42 is parallel to the longitudinal edges of recess 28. As electrode 14 moves fully within die blank 10, surface 40 of tooth 16 is brought into contact with the die blank thus forming surface 44 through the arcing action emanating from surface 40 of the electrode. Surfaces 40 and 44 are parallel and, of course, have the helix angle A of gear tooth 16.

Surfaces 42 and 44 are, therefore, those surfaces formed within the die blank between the leading and trailing edges of the gear tooth 16. At the lower surface 46 of the die blank, the opening produced by this machining operation is the same as the width of the gear tooth. At the upper surface 48 of the die blank, however, the opening is considerably greater than the gear tooth thickness. Between the upper and lower surfaces a linear circumferentially increasing opening has been formed. The opening increases its width in a circumferential direction, but there is no change in the radial direction. Consequently, the pitch diameters of the gear tooth on the electrode are nearly identical in size to the corresponding diameters formed on the die blank interior.

A die formed by this method can be used to form an extrusion by locating a length of metal to be extruded in alignment with the axis of bore 12 and adjacent the lower surface 46 of the die 10. A hydraulic press would apply an upward force to the metal forcing it through the formed die blank opening. After the extrusion has passed through the orifice portion, which is located at the lower surface 46, the metal would be free to expand tangentially within the space furnished between surfaces 42 and 44.

With regard to the forming method using the electrode shown in FIG. 1, reference is now made to FIG. 5. In FIG. 5 first and second guide recesses 20 and 24 are formed with a second helix angle A, which is equal to the first helix angle A of the gear tooth 16. A third guide recess 22 is located between recesses 20 and 24 in end-to-end relationship. Recess 22 has a third helix angle B, which in this instance is less than angle A, but could be greater than but not equal to angle A. Guide pin 26 is located within the track form by the recesses 20, 22 and 24 and operates to control the relationship between axial displacement of the electrode 14 within the die blank and rotation of the electrode about its axis. The gear tooth 16 formed on the electrode has leading and trailing surfaces 38, 40. The thickness of gear tooth 16 indicated in FIG. 5 is its thickness at the pitch diameter of the gear profile.

Electrical dishcarge machining begins with electrode 14 located on the upper surface 48 of die blank 10. In this position, the lower corner of the gear tooth defined by the intersection of the lower edge 36 and the leading edge 38 of the tooth is located on the upper surface of the die blank at point 54. The electrode is then displaced axially into the die blank according to the control exercised by slot 20 moving with respect to pin 26. During this phase, surface 50 is formed on the interior die surface by the electrical discharge effect produced at the edge formed by the intersection of surfaces 36 and 38 of the electrode.

When the electrode has moved downwardly to the point where pin 26 is located at the upper end of recess 20, the cutting edge 56 of the electrode will have moved to point 58. Following this, downward movement of the electrode brings guide pin 26 within recess 22 and the surface 60 is formed by the cutting edge 56 as it moves under the control of pin 26 within recess 22. When the electrode is moved further downwardly bringing pin 26 to the upper end of recess 22, cutting edge 56 on the electrode will have moved to point 62 within the die blank. Furthermore, the trailing surface 40 of gear tooth 16 will have been moved to the position of surface 52 on the interior portion of the die.

Continued downward movement of the electrode along the track defined by recess 24 brings the lower edge 36 of gear tooth 16 to the lower edge 46 of the die blank 10. Movement along this latter path operates to form surface 64 and the lower terminal portion of surface 52.

The die formed by the process described with reference to FIG. 5 will have produced a space within the die blank through which an extrusion blank may be forced to produce the gear tooth profile. The space so formed has a lower or orifice portion extending between surfaces 64 and 52 whose width is generally equal to the width of the gear tooth. A second space extending between surfaces 52 and 60 has a circumferentially increasing width in the direction the extrusion moves through the die. Finally, a third portion of the space extending between parallel surfaces 50 and 52 furnishes a circumferentially larger space than at the orifice that can accommodate circumferential growth of the extruded gear tooth that occurs after the gear tooth has passed through the orifice of the die. There is therefore a transition space located axially between the parallel sided spaces that opens to the full circumferential dimension of the space extending between surfaces 50 and 52. In this way, the increased area afforded the extruded gear tooth is circumferentially greater than the space at the orifice region of the die where the tooth is first formed, but is identical radially to the dimensions of the orifice region. Therefore, pertinent diameters that define the gear profile including the diameters of the addendum and dedendum circles will be the same at all axial locations of the die after this forming operation.

The helix angle of the extrusion formed within the die produced by this method will be the same helix angle as was formed on the electrode, namely, angle A. This results because at the orifice of the die, where the gear tooth profile is formed as the extrusion blank is forced upwardly through the die 10, the exact shape of the gear tooth including its helix angle matches identically the contour formed on the inner surface of the die blank.

The effect of locating recess 22 between recesses 20 and 24 and of changing the helix angle of recess 22 with respect to the helix angle of the other recesses is to vary the speed of rotation of the electrode with respect to the speed at which the electrode passes through the die blank. It is this variation in rotational speed with respect to axial speed that produces the transition surface 60 in the die blank. This variation in rotational speed with respect to axial speed can best be described with respect to velocity vectors representing the directional sense and magnitude of each velocity component.

For example, referring to FIG. 2, the first velocity component 64 represents the speed at which the electrode passes axially through the die blank. The second velocity vector 66 represents the tangential velocity of the gear tooth at the pitch diameter where helix angle B is measured. The resultant of these velocity vectors is the total velocity of the electrode represented by vector 68 and is, of course, aligned with the direction of recess 28.

This same relationship of vector components applies to the tansition region, slot 22 and to the region formed by the control exercised by slots 20 and 24 that form the parallel-sided openings within the die cavity. With reference to FIG. 5, velocity vector 70 represents the speed at which the electrode moves axially through the die blank and is assumed to be a constant whether the motion of the electrode is controlled by slots 20 and 24 or by slot 22. However if the drive speed changes, the length of all the vectors change accordingly. Velocity vectors 72, 74 represent the tangential velocity of the point on the gear contour at which helix angles A and B are measured. In this case, that point is located on the circumference of the pitch circle. Velocity vector 76 and 78 represent the total speed of the electrode as it is controlled by slots 20 and 22, respectively moving with respect to guide pin 26. Vector 76 is the resultant of vectors 70 and 72; vector 78 is the resultant of vectors 70 and 74. Therefore, it can be seen that rotation of the electrode about its axis is less when its motion is controlled by slot 22 than when its motion is controlled by slots 20 and 24.

Having thus described the preferred embodiments of my invention what I claim and desire by U.S. Letters Patent is:

1. A tool for making an extrusion die from a die blank comprising:
    an electrode having a lobed contour formed on its outer surface adapted to form the die by electrical discharge machining upon passing the electrode through the die blank;
    a lead bar adapted to rotate the electrode about the electrode axis and to displace the electrode axially with respect to the die blank, the lead bar having a guide recess formed thereon, the recess being disposed angularly with respect to the axis of the electrode thus forming a second angle therebetween, the first and second angles being unequal; and
    a guide pin fixed against movement extending within and engaging the guide recess whereby the path along which the electrode passes through the die blank is controlled.

2. The tool according to claim 1 wherein the first angle is larger than the second angle.

3. A tool for making an extrusion die from a die blank comprising:
    an electrode having a lobed contour formed on its outer surface adapted to form the die by electrical discharge machining upon passing the electrode through the die blank, the lobes making a first angle with the electrode axis;
    a lead bar adapted to rotate the electrode about the electrode axis and to displace the electrode axially with respect to the die blank, the lead bar having at least three guide recesses formed thereon disposed angularly with respect to the axis of the electrode, the first and second guide recesses forming a second angle with the electrode axis, the third guide recess forming a third angle with the electrode axis, the recesses being disposed in end-to-end arrangement, the third recess being located intermediate the first and second recesses, the first and second angles being substantially equal, the third angle being unequal to the first and second angles; and
    a guide pin fixed against movement relative to the electrode extending within and engaging the guide recesses, whereby the path along which the electrode passes through the die blank is controlled.

4. The tool according to claim 3 wherein the first and second angles are larger than the third angle.

5. The tool according to claim 1 or 3 further comprising means for concurrently rotating the electrode about its axis and passing the electrode through the die blank.

6. A method for making an extrusion die from a die blank using an electrode supplied with power from an electrical energy source, the electrode having a lobed contour formed on its outer surface, the lobes making a first angle with the axis of the electrode, using a lead bar adapted to rotate the electrode about the electrode axis and to displace the electrode axially with respect to the die blank, the lead bar having a guide recess formed thereon, the recess being disposed angularly with respect to the axis of the electrode thus forming a second angle therebetween whose magnitude is unequal to that of the first angle and using a guide pin fixed against movement relative to the electrode extending within and engaging the recess, comprising:
    passing the electrode axially through the die blank to form a hole therein by electrical discharge machining while rotating the electrode about its axis with respect to the die blank such that the path along which a point on the surface of the electrode passes through the die blank makes an angle with respect to the axis of the electrode that is not equal to the first angle, and
    controlling the passage of the electrode through the die blank by the engagement of the guide pin within the guide recess.

7. A method for making an extrusion die from a die blank using an electrode supplied with power from an electrical energy source, the electrode having a lobed contour formed on its outer surface, the lobes making a first angle with the axis of the electrode, using a lead bar adapted to rotate the electrode about the electrode axis and to displace the electrode axially with respect to the die blank, the lead bar having three guide recesses formed thereon disposed angularly with respect to the axis of the electrode, the first and second guide recesses forming a second angle with the electrode axis, the third guide recess forming a third angle with the electrode axis, the recesses being disposed in end-to-end arrangement, the third recess being located intermediate the first and second recesses, the first and second angles being substantially equal, the third angle being unequal to the first and second angles, and using a guide pin fixed against movement relative to the electrode extending within and engaging the recess, comprising:

passing the electrode axially through the die blank to form a hole therein by electrical discharging machining while rotating the electrode about its axis with respect to the die blank such that a portion of the path along which a point on the surface of the electrode passes through the die blank makes an angle with respect to the axis of the electrode that is not equal to the first angle; and controlling the passage of the electrode through the die blank by the engagement of the guide pin within the guide recesses.

* * * * *